May 11, 1943.　　　G. F. STRONG　　　2,318,814
MOTOR DRIVE FOR TOGGLE LINKS
Filed April 7, 1942　　　2 Sheets-Sheet 2
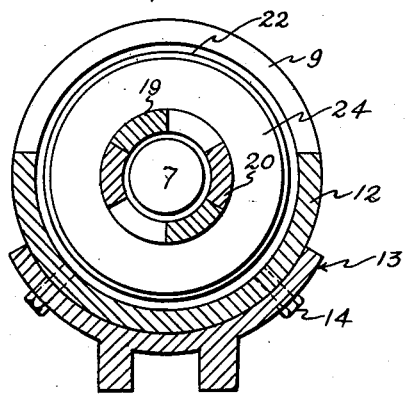
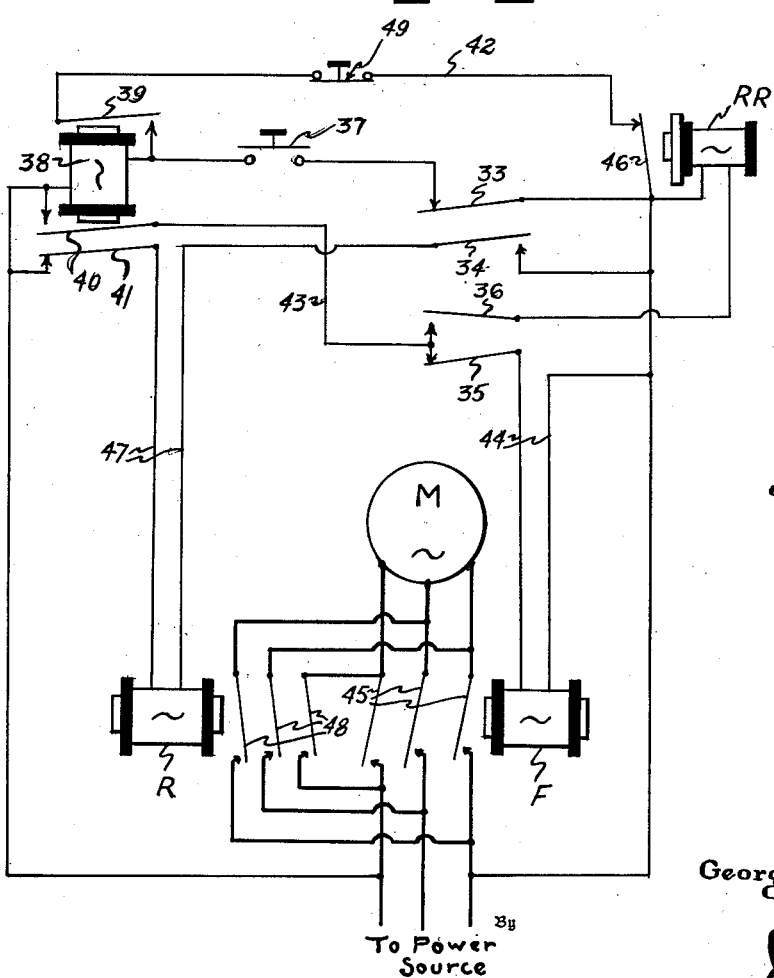
Inventor
George F. Strong
By J S Murray
Attorney Patented May 11, 1943

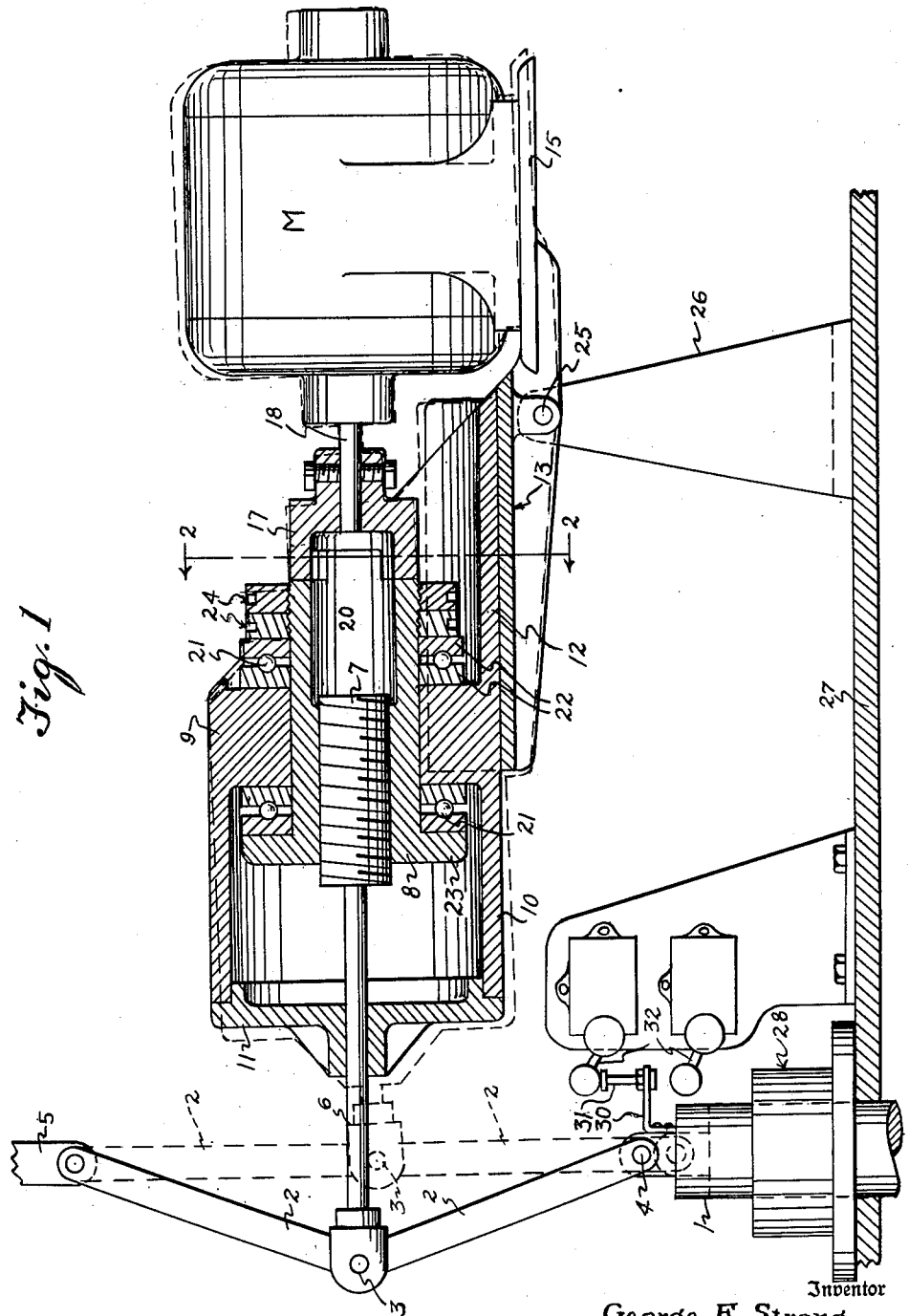

2,318,814

UNITED STATES PATENT OFFICE 2,318,814

MOTOR DRIVE FOR TOGGLE LINKS

George F. Strong, Grosse Pointe Farms, Mich.

Application April 7, 1942, Serial No. 437,995

9 Claims. (Cl. 74—25)

This invention relates to toggle mechanisms and particularly to use of such mechanisms to apply high pressures.

An object of the invention is to adapt a pair of toggle links for continuous operation by an electric motor and to adapt high pressures to be applied by a motor of relatively low rating by using a screw means to translate the motor torque into a straight line force applied to the toggle.

Another object is to provide a unitary mounting for said screw means and for a slide rod operating the toggle linkage from the screw means.

A further object is to install said unitary mounting and a drive motor for said mechanism on a platform adapted to rock to compensate for swinging of the toggle links.

A further object is to employ a reversing motor to drive said mechanism and to utilize travel of a plunger driven by the toggle links to control limit switches for reversing the motor.

A further object is to adapt the motor, upon each reversal thereof to apply a sudden blow to the screw mechanism, thereby overcoming any tendency of such mechanism to wedge in its high pressure positions.

These and other various other objects are attained by the construction hereinafter described and illustrated in the accompanying drawings, wherein:

Fig. 1 is a longitudinal vertical sectional view of the mechanism, showing the plunger raised in full lines and lowered in dash lines.

Fig. 2 is a cross sectional view taken on the line 2—2 of Fig. 1.

Fig. 3 is a diagram showing a provision for automatically reversing the motor.

In these views, the reference character 1 designates a plunger required to reciprocate continuously and transmit a powerful downward pressure. Such a plunger has numerous uses, a particularly important one being the actuation of a welding electrode (not shown) into and out of engagement with work. A pair of toggle links 2 pivotally interconnected at 3, serve to actuate the plunger 1, one of their relatively remote ends being pivoted at 4 to the plunger and the other being pivoted to a bracket 5 fixed in any desired manner. Pivotally engaged with said links at their interconnection is the forward end of a slide rod 6 having a screw 7 rigidly carried by and coaxial with its rear portion. Said screw is threaded into an elongated nut 8 having a cylindrical outer face journaled in a circular wall 9. From said wall a cylindrical housing 10 projects forwardly and is closed at its front end by a cover 11 forming a slide bearing for the rod 6. A hollow rearward projection 12 from the wall 9 comprises side walls progressively reduced in height and a bottom wall, the exterior face of said projection being cylindrical and continuous with that of the housing 10. The wall 9, housing 10, and projection 12 form a unitary mounting for the slide rod and elongated nut, maintaining said rod and nut in accurate alignment. Said mounting seats upon the transversely curved forward portion 13 of a platform, such portion closely conforming to the cylindrical bottom face of the mounting, and a plurality of tap screws 14 rigidly hold the mounting in place. A rear portion 15 of the platform carries a reversible electric motor M from which the nut 8 is driven. It is preferred to establish this drive by rigidly fastening a collar 17 on the motor shaft 18 and forming a few intermeshed teeth 19 and 20 on the front end of said collar and rear end of said nut. As is best seen in Fig. 2, these teeth are not closely interfitting but afford a material rotative play between collar and nut, the advantage of this being explained hereinafter.

At front and back of the wall 9, a thrust reaction imposed on the nut is taken care of by anti-friction elements 21 mounted in annular race members 22 surrounding the nut. The front set of said elements and corresponding race members are engaged between the wall 9 and an annular flange 23 on the nut. The rear set of elements 21 and the corresponding race numbers are held in place by two nuts 24 exteriorly threaded on the nut 8.

To permit the platform 13, 15 to undergo a slight angular motion, it is pivoted as indicated at 25 about an axis parallel to the pivot axes of the toggle linkage. Preferably the pivot 25 surmounts a bracket 26 upstanding from a base plate 27 and the latter further carries a slide bearing 28 for the plunger 1.

In operation of the invention as so far described, upon energization of motor M, the nut 8 is rotatively driven, and feeds the screw 7 and rod 6 forward or back according to direction of motor rotation. When the rod travels forwardly it diverges the toggle links and thereby raises plunger 1, and rearward actuation of the rod lowers the plunger. As the toggle links approach mutual alignment, they are capable of imposing a powerful downward pressure on the plunger. Since the motor takes effect on the plunger with aggregate mechanical advantage of the toggle links and screw mechanism, it is apparent that the force transmitted is so multiplied that rating of the motor may be quite low as compared to applied plunger pressure.

The connection of the rod 6 to the toggle links suffices to overcome the rotary component of the force applied by the nut, and motor is fully protected from the powerful thrust reaction of the screw on the nut by installing the anti-friction elements 21 as described.

It is essential to maintain perfect alignment of the slide rod and nut and employment of a unitary mounting for these parts assures such alignment.

Since upper end of the toggle linkage is fixed, operation of said linkage entails some vertical play of the mid-point of the linkage. Such play is afforded without interference with the described actuating mechanism by pivoting the platform 13, 15 at 25, as has been described.

When the plunger is fully lowered and under heavy pressure considerable frictional stress must be overcome in initiating upstroke of the plunger. By afford a material degree of lost motion between the teeth 19 and 20 the collar 17 acquires a slight momentum before it picks up the nut and consequent impact readily overcomes said frictional stress.

Describing now a provision for controlling the motor M and effecting its automatic reversal in upper and lower limiting positions of the plunger 1, 30 designates an arm rigidly and laterally projecting from the upper end of the plunger and carrying a limit switch actuator 31. Upper and lower pivotal arms 32 are engaged and swung by the actuator 31, as it reaches its raised and lowered positions, a pair of switches 33 and 34 being controlled by the upper arm and a pair of switches 35 and 36 being controlled by the lower arm. These switches are diagrammatically shown in Fig. 3 together with the entire electrical control for the motor.

Normally the plunger is raised, the switches 33 and 35 then being closed and the switches 34 and 36 open, as per Fig. 3. To start the mechanism, a normally open push button switch 37 is momentarily closed, thereby energizing coil of a relay 38. Said relay then closes switches 39 and 40 and opens switch 41. The switch 39 closes a shunt 42 to maintain energization of the coil 38 independently of switch 37. The switch 40, in closing allows current to flow through conductor 43, switch 35, and conductors 44 to the relay F for inducing forward rotation of the motor M. The switch arms 45 controlled by said relay then close the motor circuit and the motor drives the plunger 1 downward. After a predetermined down travel of the plunger, the lower limit switches 35 and 36 are actuated, breaking the circuit of relay F and cutting off power to the motor. The retarded relay R. R. is now in a closed circuit and after a predetermined interval this relay, through its switch arm 46 opens shunt 42 and thus deenergizes relay 38. This permits the switch arm 41 to close the circuit 47 of relay R which acts through switch arms 48 to deliver reversing current to the motor M. The latter now raises the plunger 1, which in reaching its upper limit opens the limit switch 34 to deenergize the relay R. The same cycle may be repeated as often as desired. An immediate return of the plunger 1 to its raised position and deenergization of the motor may be effected at any time by opening the push button switch 49, since this deenergizes the relay 38 and assures energization of relay R and deenergization of relay F.

By selecting a suitable motor M, the described mechanism may be adapted to quite rapidly repeat its cycle, while applying powerful pressure to the plunger in its lowered or working position. Thus it is especially suited for spot welding, accomplishing such work with a maximum rapidity and under complete and accurate control.

It is important to note that use of the nut and screw to actuate the toggle from the motor serves to lock the mechanism against a relief of pressure applied by the motor except by reversing the motor drive. Thus an applied pressure may be maintained for any desired period of time and no energy need be applied to prevent relief of pressure.

The invention is presented as including all such modifications and changes as come within the scope of the following claims.

What I claim is:

1. The combination with two coaxial members having interengaged screw threads, one of said members being rotative to drive the other along their common axis, of a reversible electric motor driving the rotary member, a slide guide for the driven member, a pair of toggle links actuable by the driven member, and a plunger actuable by the toggle links, and means for guiding the plunger in a straight line motion.

2. The combination as set forth in claim 1, the rotary screw-threaded member being a nut and the other screw-threaded member being restrained from rotation by its engagement with the toggle links.

3. The combination with a support comprising a journal bearing and a slide bearing in aligned spaced relation, of a nut journaled in the journal bearing, a reversible electric motor driving the nut, a screw engaging the nut and actuatable longitudinally by the nut, a thrust rod mounted in said slide bearing and rigidly connected to the screw, a pair of toggle links actuatable by the thrust rod, and a plunger actuable by the toggle links.

4. In the combination as set forth in claim 3, abutments carried by the nut at opposite sides of the journal bearing, and anti-friction thrust elements interposed between the journal bearing and said abutments.

5. In the combination as set forth in claim 3, a platform mounting said support and motor, and means pivoting said platform to swing about an axis parallel to the pivots of the toggle links.

6. In the combination set forth in claim 3, a pair of limit switches reversely exercising control of the motor, and an actuator for such switches carried by the plunger.

7. In the combination set forth in claim 1, a lost motion drive connection between the motor and said rotative member to impose an impact on the rotative member for overcoming initial resistance of the toggle links to a load-relieving drive.

8. The combination with a support comprising a journal bearing and a slide bearing in aligned spaced relation, of two members having interengaged screw threads, one of said members being journaled in said journal bearing, a thrust rod mounted in said slide bearing and connected to the other of said members to be slid thereby, antifriction elements receiving the thrust incidental to rotation of said journaled member, a pair of toggle links actuable by the thrust rod, and a plunger actuable by said links.

9. The combination set forth in claim 8, said support forming a housing wherein said members are interengaged and said bearings being formed in opposite walls of said housing.

GEORGE F. STRONG.